US012020508B2

(12) United States Patent
Johnson et al.

(10) Patent No.: US 12,020,508 B2
(45) Date of Patent: Jun. 25, 2024

(54) SYSTEMS AND METHODS FOR PREDICTING ELBOW JOINT POSES

(71) Applicant: Meta Platforms Technologies, LLC, Menlo Park, CA (US)

(72) Inventors: Samuel Alan Johnson, San Carlos, CA (US); Mahdi Salmani Rahimi, San Francisco, CA (US); Benjamin Antoine Georges Lefaudeux, Menlo Park, CA (US); Kishore Venkateshan, Burlingame, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/296,919

(22) Filed: Apr. 6, 2023

(65) Prior Publication Data
US 2023/0245499 A1 Aug. 3, 2023

Related U.S. Application Data

(63) Continuation of application No. 17/024,581, filed on Sep. 17, 2020, now Pat. No. 11,651,625.

(51) Int. Cl.
*G06V 40/20* (2022.01)
*G06F 3/01* (2006.01)
(Continued)

(52) U.S. Cl.
CPC .............. *G06V 40/20* (2022.01); *G06F 3/012* (2013.01); *G06N 5/04* (2013.01); *G06N 20/00* (2019.01); *G06T 7/70* (2017.01); *G06T 19/006* (2013.01)

(58) Field of Classification Search
CPC ......... G06T 7/70; G06T 19/006; G06F 3/012; G06V 40/20; G06N 5/04; G06N 20/00
See application file for complete search history.

(56) References Cited

U.S. PATENT DOCUMENTS

| 6,700,552 B2 | 3/2004 | Kollin et al. |
| 7,232,071 B2 | 6/2007 | Lewis et al. |
| 7,558,455 B2 | 7/2009 | Weir et al. |

(Continued)

FOREIGN PATENT DOCUMENTS

| WO | 2020060666 A1 | 3/2020 |
| WO | 2020097631 A1 | 5/2020 |

OTHER PUBLICATIONS

Cha Y.W., et al., "Towards Fully Mobile 3D Face, Body, and Environment Capture Using Only Head-Worn Cameras," IEEE Transactions on Visualization and Computer Graphics, 2018, vol. 24, No. 11, 12 Pages.

(Continued)

*Primary Examiner* — Doon Y Chow
(74) *Attorney, Agent, or Firm* — McDermott Will & Emery LLP

(57) ABSTRACT

A computing system may receive an image captured by a camera, and determine based on (1) one or more regions in the image that include a portion of a body of a user, and (2) a camera pose of the camera, a three-dimensional volume constraint that stems from the camera pose in which an elbow of the user is likely to be located. The system may infer, based on at least the three-dimensional volume constraint, an elbow pose of the user, wherein the elbow pose includes a location associated with an elbow of the user in three-dimensional space. The system may determine the location associated with the elbow is outside the three-dimensional volume constraint, and in response to the determination, adjust the inferred elbow pose. The system may generate, based on the adjusted elbow pose, a body pose of the user that includes at least the adjusted elbow pose.

20 Claims, 8 Drawing Sheets

(51) Int. Cl.
*G06N 5/04* (2023.01)
*G06N 20/00* (2019.01)
*G06T 7/70* (2017.01)
*G06T 19/00* (2011.01)

(56) References Cited

U.S. PATENT DOCUMENTS

| | | | |
|---|---|---|---|
| 10,056,020 | B2 | 8/2018 | Chi et al. |
| 10,168,537 | B1 | 1/2019 | Parsons |
| 11,100,664 | B2* | 8/2021 | Wantland ............ G06T 19/006 |
| 11,386,988 | B2* | 7/2022 | Johnsson ............ G16H 50/20 |
| 2008/0073163 | A1 | 3/2008 | Weir et al. |
| 2015/0192413 | A1 | 7/2015 | Bellusci et al. |
| 2016/0170603 | A1* | 6/2016 | Bastien ............ H04N 13/254 |
| | | | 348/49 |
| 2016/0321841 | A1* | 11/2016 | Christen ............ G02B 27/017 |
| 2018/0052325 | A1 | 2/2018 | Bohn |
| 2018/0070864 | A1 | 3/2018 | Schuster |
| 2018/0120559 | A1 | 5/2018 | Yeoh et al. |
| 2019/0102927 | A1 | 4/2019 | Yokokawa |
| 2020/0008712 | A1 | 1/2020 | Takenaka |
| 2020/0218889 | A1 | 7/2020 | Masui et al. |
| 2020/0226814 | A1 | 7/2020 | Tang et al. |
| 2020/0371584 | A1* | 11/2020 | Zhao ............ G06F 3/0346 |
| 2021/0081052 | A1* | 3/2021 | Singh ............ G06F 3/017 |

OTHER PUBLICATIONS

International Search Report and Written Opinion for International Application No. PCT/US2021/045054, mailed Dec. 2, 2021, 10 pages.

International Search Report and Written Opinion for International Application No. PCT/US2021/046062, mailed Dec. 3, 2021, 10 pages.

Nakao A., et al., "Integrated Waveguide-Type Red-Green-Blue Beam Combiners for Compact Projection-Type Displays," Optics Communications, May 23, 2014, vol. 330, pp. 45-48.

Piggott A.Y., et al., "Inverse Design and Demonstration of a Compact and Broadband On-Chip Wavelength Demultiplexer," Physics Optics, Apr. 1, 2015, 15 pages.

Rhodin; et al., "EgoCap: Egocentric Marker-Less Motion Capture with Two Fisheye Cameras." ACM Transactions on Graphics (TOG), Dec. 5, 2016, vol. 35, No. 6, 11 pages.

Yoshida T., et al., "Polarization-Insensitive Vertically Curved Si Surface Optical Coupler Bent by Ion Implantation, "IEEE Photonics Technology Letters, Oct. 15, 2020, vol. 32 (20), pp. 1319-1322.

Yu S., et al., "Integrated Quadratic Reflectors for High-Performance Optical Interconnects," 2020 IEEE Photonics Conference, Sep. 28, 2020, 2 pages, Retrieved from the Internet: URL: https://ieeexplore.IEEE.org/document/9252220.

* cited by examiner

SYSTEMS AND METHODS FOR PREDICTING ELBOW JOINT POSES

PRIORITY

This application is a continuation under 35 U.S.C. § 120 of U.S. patent application Ser. No. 17/024,581, filed 17 Sep. 2020, which is incorporated herein by reference.

TECHNICAL FIELD

This disclosure generally relates to predicting poses of an elbow joint of a user.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers

SUMMARY OF PARTICULAR EMBODIMENTS

Embodiments described herein relate to methods of predicting one or more joint poses of a user associated with one more components of an artificial reality system. To enable a computing system to generate an accurate pose of one or more joints, the computing system may receive one or more sensor data or image data from one or more components of the artificial reality system, for example sensor data from motion-tracking sensors or image data received from one or more cameras. Using various techniques described herein, the image data and sensor data permits the computing system to accurately track or predict the pose of one or more joints associated with the user, for example a head pose or wrist pose. Particular embodiments further provide a method to infer one or more joint poses via a non-linear kinematic solver. For example, the non-linear solver may receive sensor data from one or more components of the artificial reality system. This is especially useful for one or more joints that cannot be accurately tracked with the received sensor data.

In addition, particular embodiments described herein permit the computing system to utilize one or more images received from one or more cameras associated with the artificial reality system to generate additional constraints for the non-linear solver. For example, the computing system may utilize the one or more images containing at least a portion of the user to generate a segmentation mask in an image plane which identifies one or more regions that contains at least a portion of the user. Using techniques described herein, the computing system may place this segmentation mask into the three-dimensional scene. The computing system may generate a three-dimensional volume constraint where the body of the user is located by casting rays from the one or more cameras to the regions of the segmentation mask that contain at least a portion of the user. This three-dimensional volume constraint provides another constraint that can be utilized by the non-linear solver to output a more accurate prediction of one or more joint poses. This is especially useful for joint poses where sensor data or image data may be limited, for example an elbow joint pose, as described herein.

Embodiments of the invention may include or be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in particular embodiments, artificial reality may be associated with applications, products, accessories, services, or some combination thereof, that are, for example, used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
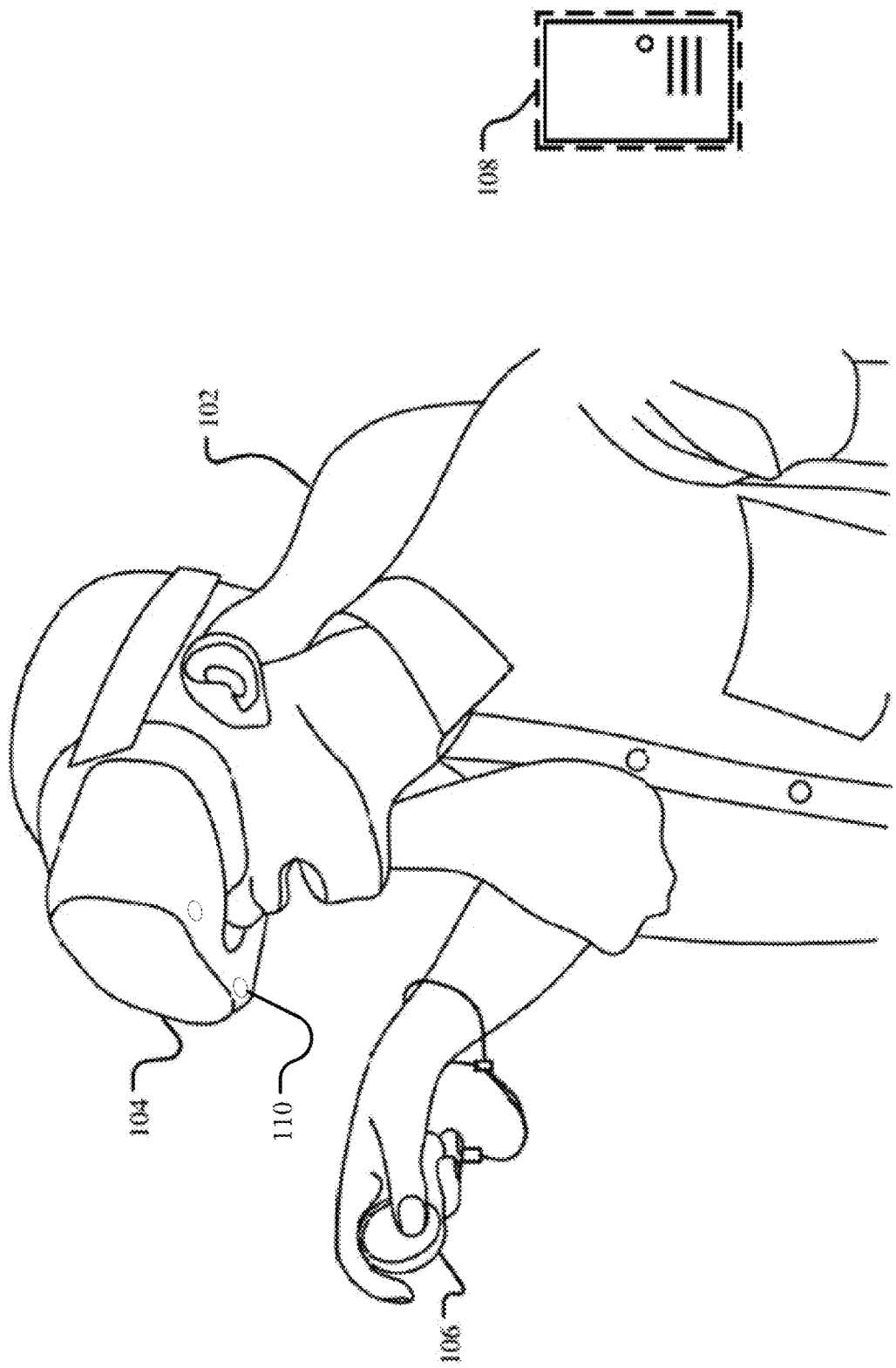
FIG. 1 illustrates an example artificial reality system.

FIG. 1 illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may comprise one or more cameras 110 which can capture images and videos of environments. The headset 104 may include an eye tracking system to determine a vergence distance of the user 102. A vergence distance may be a distance from the user's eyes to objects (e.g., real-world objects or virtual objects in a virtual space) that the user's eyes are converged at. The headset 104 may be referred to as a head-mounted display (HMD).

One or more controllers 106 may be paired with the artificial reality system 100. In particular embodiments one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

In particular embodiments the computing system 108 may receive sensor data from one or more components of artificial reality system 100. For example and not by way of limitation, the headset 104 may include a gyroscope or inertial measurement unit that tracks the user's real-time movements and output sensor data to represent or describe the movement. The sensor data provided by such motion-tracking sensors may be used by the computing system 108 to determine the user's current orientation and provide that orientation to the rendering engine to orient/reorient the virtual camera in the 3D space. As another example and not by way of limitation, the one or more controllers 106 may include inertial measurement units (IMUs) and infrared (IR) light emitting diodes (LEDs) configured to collect and send IMU sensor data to the computing system 108. In particular embodiments the computing system 108 may utilize one or more sensor data with one or more tracking techniques, for example and not by way of limitation, SLAM tracking or IR-based tracking, to determine a pose of one or more components of artificial reality system 100.

In particular embodiments the computing system 108 may receive one or more image data from one or more components of artificial reality system 100. In particular embodiments this image data comprises image data captured from one or more cameras 110 associated with artificial reality system 100. For example, FIG. 1 depicts one or more cameras 110 coupled within headset 104. These one or more cameras 110 may be positioned to capture images associated with various perspectives, for example and not by way of limitation, one or more cameras associated with headset 104 that face downward (e.g. towards the feet of user 102 while standing).

In particular embodiments, the computing system 108 may determine a pose of the one or more cameras 110 in a three-dimensional space. The computing system may utilize one or more of the sensor data or the image data to determine a pose of the one or more cameras 110. In particular embodiments the computing system 108 may utilize a localization technique, such as SLAM, to determine the pose of the one or more cameras 110 in a three-dimensional coordinate space. In particular embodiments this pose may be represented using one or more coordinate systems, for example and not by way of limitation, via an absolute global coordinate system (e.g., x, y, z) or via a localized coordinate system relative to one or more components of artificial reality system 100, for example and not by way of limitation, a headset 104 or one or more controllers 106.

In particular embodiments computing system 108 may determine a pose of the headset 104 associated with user 102. The headset pose may be determined by utilizing any of the sensor data or image data received by the computing system 108. The headset pose associated with user 102 may comprise a location and an orientation of the headset 104. In particular embodiments the location and orientation comprising the headset pose associated with user 102 may be represented using one or more coordinate systems, for example and not by way of limitation, via an absolute global coordinate system (e.g., x, y, z), or via a localized coordinate system relative to one or more components of artificial reality system 100 or one or more joints of user 102, for example and not by way of limitation, one or more controllers 106.

In particular embodiments computing system 108 may determine a controller pose of one or more controllers 106 associated with user 102. The controller pose associated with user 102 may be determined by utilizing any of the sensor data or image data received by the computing system 108. In particular embodiments the computing system 108 may use one or more computer vision techniques, for example and not by way of limitation, image classification or object detection, to determine the pose of the controller 106 associated with user 102. The controller pose associated with user 102 may comprise a location and an orientation of controller 106. The location and orientation comprising the controller pose associated with user 102 may be represented using one or more coordinate systems, for example and not by way of limitation, via an absolute global coordinate system (e.g., x, y, z), or via a localized coordinate system relative to one or more components of artificial reality system 100 or one or more joints of user 102, for example and not by way of limitation, headset 104. Methods for determining controller poses are described further in U.S. application Ser. No. 16/734,172, filed Jan. 3, 2020, entitled "Joint Infrared and Visible Light Visual-Inertial Object Tracking," hereby incorporated by reference in its entirety.

Figure 2:
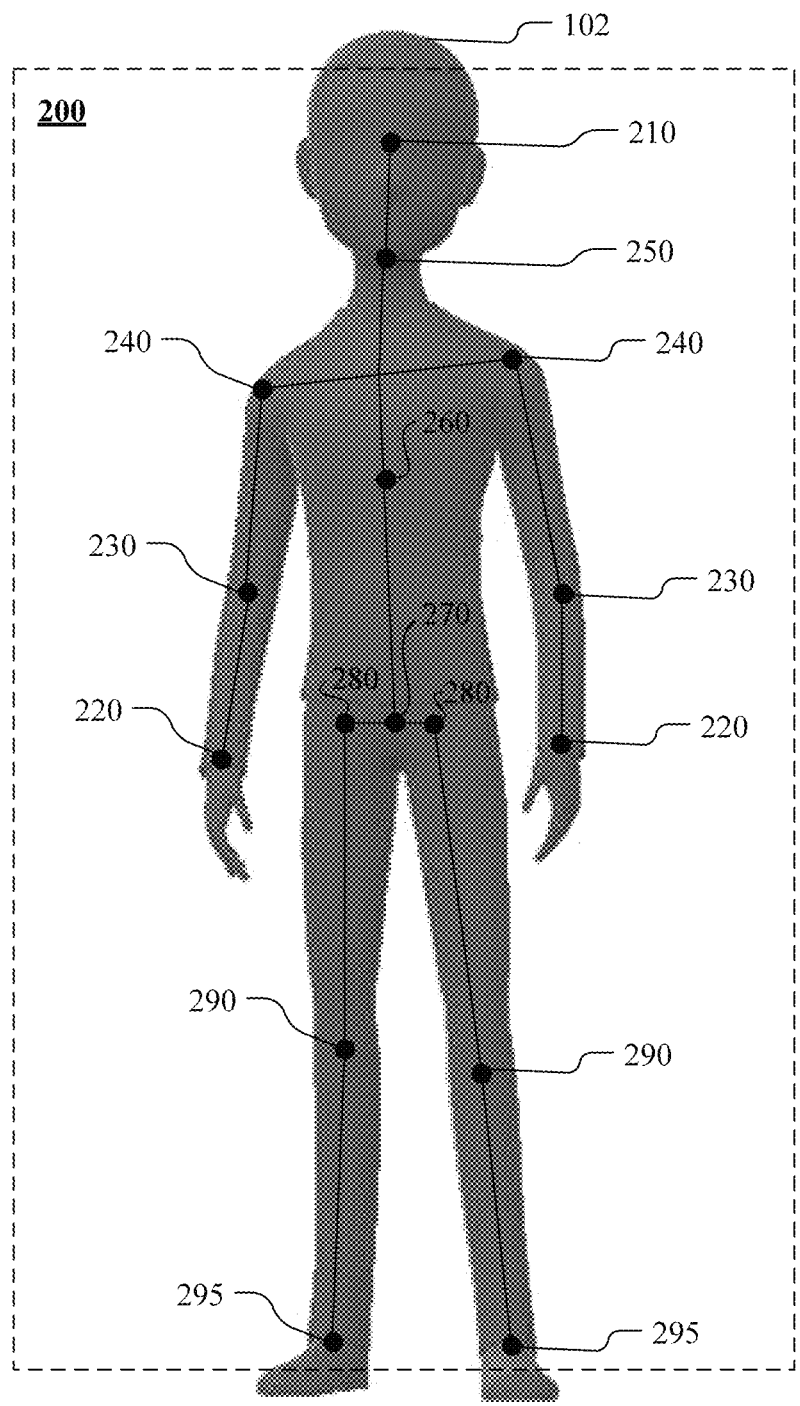
FIG. 2 illustrates a sample body pose associated with a user of an artificial reality system.

FIG. 2 illustrates a sample body pose associated with user 102. In particular embodiments, computing system 108 may generate a body pose 200 associated with user 102. Body pose 200 associated with user 102 attempts to replicate a position and orientation of one or more joints of user 102 utilizing artificial reality system 100 at a particular time. In particular embodiments, the body pose 200 associated with user 102 comprises a skeletal frame of inverse kinematics ("skeleton" or "body pose"), which may comprise a list of one or more joints. In particular embodiments the body pose includes the joint pose of one or more joints associated with user 102, for example and not by way of limitation, a head pose 210, a wrist pose 220, an elbow pose 220, a shoulder pose 240, a neck pose 250, an upper spine pose 260, a lower spine pose 270, a hip pose 280, a knee pose 290, or an ankle pose 295.

In particular embodiments one or more joint poses comprising body pose 200 may be determined or inferred using received sensor and/or image data from one or more components of artificial reality system 100. In particular embodiments one or more joint poses comprising body pose 200 may be determined or inferred using a combination of one or more techniques, for example and not by way of limitation localization techniques (e.g., SLAM), machine learning techniques (e.g., a neural network), visualization techniques (e.g., image segmentation), or optimization techniques (e.g., a non-linear solver). In particular embodiments one or more of these techniques may be utilized separately or in conjunction with one or more other techniques. This one or more joint poses comprising body pose 200 produced from these described techniques may be useful for a variety of applications as described herein.

In particular embodiments computing system 108 may determine a head pose 210 associated with the user 102. The head pose 210 associated with user 102 may be determined by utilizing any of the sensor data and/or image data received by the computing system 108. The head pose 210 may comprise a location and an orientation of the head joint of user 102 while wearing the headset 104. In particular embodiments this head pose 210 associated with user 102 may be determined based on the pose of the headset 104 and a known spatial relationship between the headset 104 and the head of user 102. The location and orientation comprising the head pose 210 associated with user 102 may be represented using one or more coordinate systems, for example and not by way of limitation, via an absolute global coordinate system (e.g., x, y, z), or via a localized coordinate system relative to one or more components of artificial reality system 100 or one or more other joints associated with user 102 (e.g., the wrist joint), or in relation to headset 104. In particular embodiments the head pose 210 associated with user 102 may be determined based on sensor data associated with headset 104 worn by user 102.

In particular embodiments the computing system 108 may determine a wrist pose 220 of user 102. In particular embodiments, The wrist pose 220 may be determined by utilizing any of the sensor data and/or image data received by the computing system 108. In particular embodiments the computing system 108 may use one or more computer vision techniques, for example and not by way of limitation, image classification or object detection, to determine the wrist pose 220. In particular embodiments the wrist pose 220 may be determined based on the controller pose and a known spatial relationship between the controller 106 and the wrist of user 102. The location and orientation comprising the wrist pose 220 may be represented using one or more coordinate systems, for example and not by way of limitation, via an absolute global coordinate system (e.g., x, y, z), or via a localized coordinate system relative to one or more components of artificial reality system 100 or one or more other joints associated with user 102 (e.g., the head joint), or in relation to headset 104.

While these techniques typically allow for reliable determination of the pose of certain joints (e.g. the head pose and wrist pose, as described herein) comprising a body pose 200, these techniques may be unreliable and inaccurate for one or more other joints that comprise body pose 200 (e.g., an elbow joint pose 230) due to user 102 only wearing headset 104 and/or one or more controllers 106. As a result, the limitations in the sensor or image data associated with artificial reality system 100 may lead to inaccurate determinations of the pose of one or more joints.

To remedy this problem, particular embodiments described herein utilize a non-linear kinematic optimization solver ("non-linear solver") to infer one or more joint poses or one or more external contours that comprise a body pose 200 associated with user 102, resulting in a more accurate determination of body pose 200. In particular embodiments the non-linear solver may comprise a C++ library built for inverse kinematics with a large set of common error functions that cover a wide range of applications. In particular embodiments the non-linear solver may provide one or more helper functions for tasks that are usually related to global inverse kinematics problems (e.g., joint and skeleton structures, meshes and linear-blend skinning, error functions for common constraints) or one or more helper functions for mesh deformations (e.g., Laplacian surface deformation) or one or more 10 functions for various file formats.

One or more joint poses comprising body pose 200 associated with user 102 inferred by the non-linear solver may comprise a kinematic hierarchy at a particular time or state which is stored as a list of one or more joint poses. In particular embodiments the non-linear solver may include one or more basic solvers supported to infer the pose of one or more joints or one or more external contours comprising body pose 200, for example and not by way of limitation a L-BFGS or a Gauss-Newton solver. In particular embodiments the non-linear solver may utilize a skeletal solver function to infer a single frame of inverse kinematics (a single body pose). For example, the skeletal solver function may take a current one or more parameters (e.g., a joint pose) set as an input and optimize the activated subset of parameters given the defined error functions. The convention of the non-linear solver is to minimize the error value of the current function (e.g., the skeletal solver function) to infer an accurate body pose 200.

In particular embodiments the non-linear solver may represent the one or more joints poses through, for example and not by way of limitation, a subset of parameters that represent a position or orientation of each joint in a body pose 200. In particular embodiments the non-linear solver may parametrize each joint pose associated with user 102 by 7 degrees of freedom: 3 translation values (e.g., x, y, z), 3 rotation values (e.g., Euler angles in radians), and 1 uniform scale value. In particular embodiments these parameters may be represented using one or more coordinate systems, for example and not by way of limitation, via an absolute global coordinate system (e.g., x, y, z) or via a localized coordinate system relative to a parent joint, for example and not by way of limitation, a head joint.

In particular embodiments the non-linear solver may assign one or more variable limits for each joint pose parameter (e.g., a minimum or maximum value). In particular embodiments the non-linear solver may assign predetermined static weights to each joint pose parameter. These predetermined static weights may be determined, for example and not by way of limitation, based on the accuracy of the sensor data used to determine the value of each variable. For example, the joint pose parameters representing the head pose 210 and wrist pose 220 associated with user 102 may be assigned a higher static weight because they are determined with more accurate methods, such as SLAM techniques as described herein, than one or more other joint poses or variables within a joint pose parameter. In particular embodiments, the non-linear solver may use the parameters and predetermined static weights to infer a body pose 200, which infers the most likely poses of the joints of user 102 at a particular time or state. This inferred body pose may comprise the pose of one or more joints of user 102, for example and not by way of limitation, an elbow joint 230.

In particular embodiments the non-linear solver may instead solve for one or more external contours representing the pose of user 102. In particular embodiments, these external contours may represent a volumetric contour of the user 102, for example and not by way of limitation, the contour of the user's spine, arm, leg, etc. In particular embodiments the non-linear solver may represent each inferred external contour associated with user 102 by a mathematical formula, for example a polynomial function. In particular embodiments, the one or more joint poses and one or more external contours may be related through a statistical model, for example SMPL. While this disclosure primarily describes the non-linear solver inferring one or more joint poses using the methods described herein for readability and clarity, the non-linear solver may, depending on its computation and perception capabilities, instead solve for one or more external contours of user 102 in lieu of or in addition to one or more joint poses using the same methods described herein. The computing system may utilize the inferred external contours to subsequently solve for one or more joint poses using the statistical models, or vice versa.

While the non-linear solver infers a body pose 200 associated with user 102, the accuracy of the poses of the one or more joints outputted by the non-linear solver may be inaccurate or unrealistic due to one or more limitations with the data inputted to the solver. This is particularly likely for complex joints that cannot be accurately determined using known techniques (e.g., an elbow joint 230) due to limitations in the sensor data and/or image data received by computing system 108. This leads to one or more joint poses outputted by the non-linear solver are incorrect relative to the actual pose of user 102. For example and not by way of limitation, computing system 108 may be unable to determine the relationship between the pose of elbow joint 330 and one or more other joints poses (e.g., the wrist pose 220) or controller 106. Without additional information, it may be difficult to accurately determine, the pose of one or more joints (e.g., elbow joint 230). This may result in a body pose 200 comprising one or more unrealistic joint poses, for example and not by way of limitation, an elbow pose 230 that appears to suggest, for example, a dislocated, broken, or subluxated elbow joint, despite user 102 not sustaining an injury while using artificial reality system 100.

To remedy this deficiency, the present invention improves the accuracy of the elbow pose 230 determined by the non-linear solver by utilizing image data received from one or more cameras 110 to provide additional constraints. These additional constraints regarding the pose of one or more joints may be inputted to the non-linear solver, resulting in more accurate prediction of one or more joint poses. In particular embodiments these one or more constraints may be a volume constraint, which represents a three-dimensional volume where one or more portions of the body of user 102 may be located. With such additional constraints, the non-linear solver can infer a more accurate and realistic representation one or more joints comprising the body pose 200 associated with user 102.

In particular embodiments the non-linear solver may further utilize data from one or more pose priors to remedy this deficiency and more accurately solve for one or more joint poses of the user 102. The non-linear solver may access one or more pose priors from a motion capture database to more accurately infer one or more joint poses. The motion capture database may comprise, for example and not by way of limitation, prior information regarding possible poses of one or more joints, for example an elbow joint. In particular embodiments, the information in the motion capture database may be collected by running a motion capture protocol on different users and aggregating all the collected joint poses into clusters of commonly seen poses. The non-linear solver may utilize the one or more pose priors to calculate a distribution of pose priors (e.g., the frequency with which a particular joint pose occurs in the motion capture database). In particular embodiments this distribution may be determined by, for example and not by way of limitation, a Mixtures of Probabilistic Principal Component Analysers (MPPCA). In particular embodiments the non-linear solver may only calculate a distribution on a subset of all degrees of freedom, or just for specific regions of the body of the user (e.g., a pose prior for one or more joints in the shoulder area). Utilizing one or more pose priors permits the non-linear solver to bias towards inferring a more plausible pose of one or more joints of the user 102.

Figure 3A:
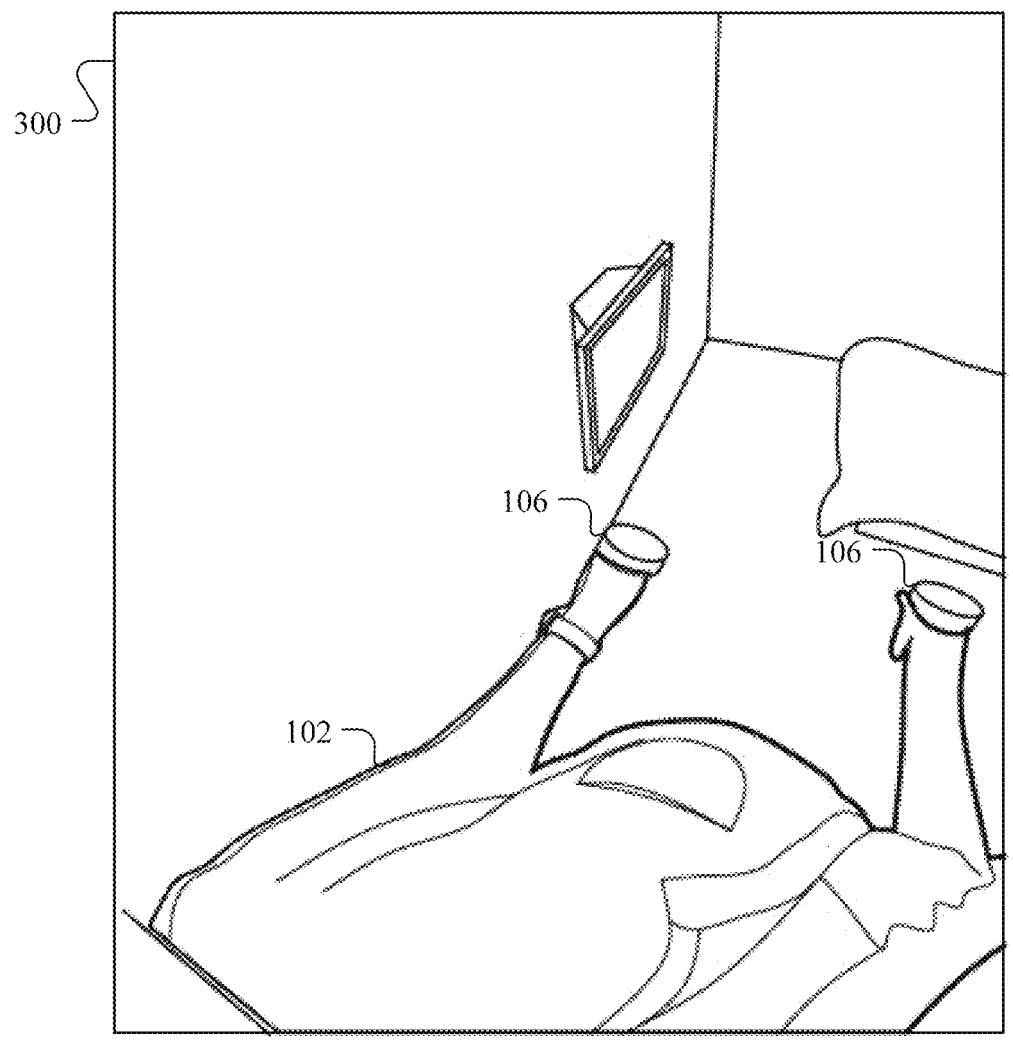
FIG. 3A illustrates a sample image captured from one or more cameras associated with an artificial reality system.

In particular embodiments, the computing system 108 receives image data, for example and not by way of limitation, comprising one or more captured images or a captured sequence of images from one or more cameras 110. FIG. 3A illustrates a sample image captured from one or more cameras 110 associated with artificial reality system 100. In particular embodiments the captured image 300 includes, for example and not by way of limitation, at least a portion of the body of user 102, at least a portion of controller 106, or at least a portion of the environment in which the user is located (e.g., a wall or a television in a real environment as depicted in FIG. 3A). In particular embodiments the image is captured from one or more cameras 110 that are positioned to face downward (e.g., towards the feet of user 102 while standing and wearing headset 104). In particular embodiments the head pose 210 associated with user 102, the wrist pose 220 associated with user 102, and the one or more captured images 300 may be associated with an identical timestamp (i.e., they correspond to the same instant in time). In particular embodiments this timestamp may be recorded with the associated head pose 210 associated with user 102, the wrist pose 220 associated with user 102, and the one or more captured images.

Figure 3B:
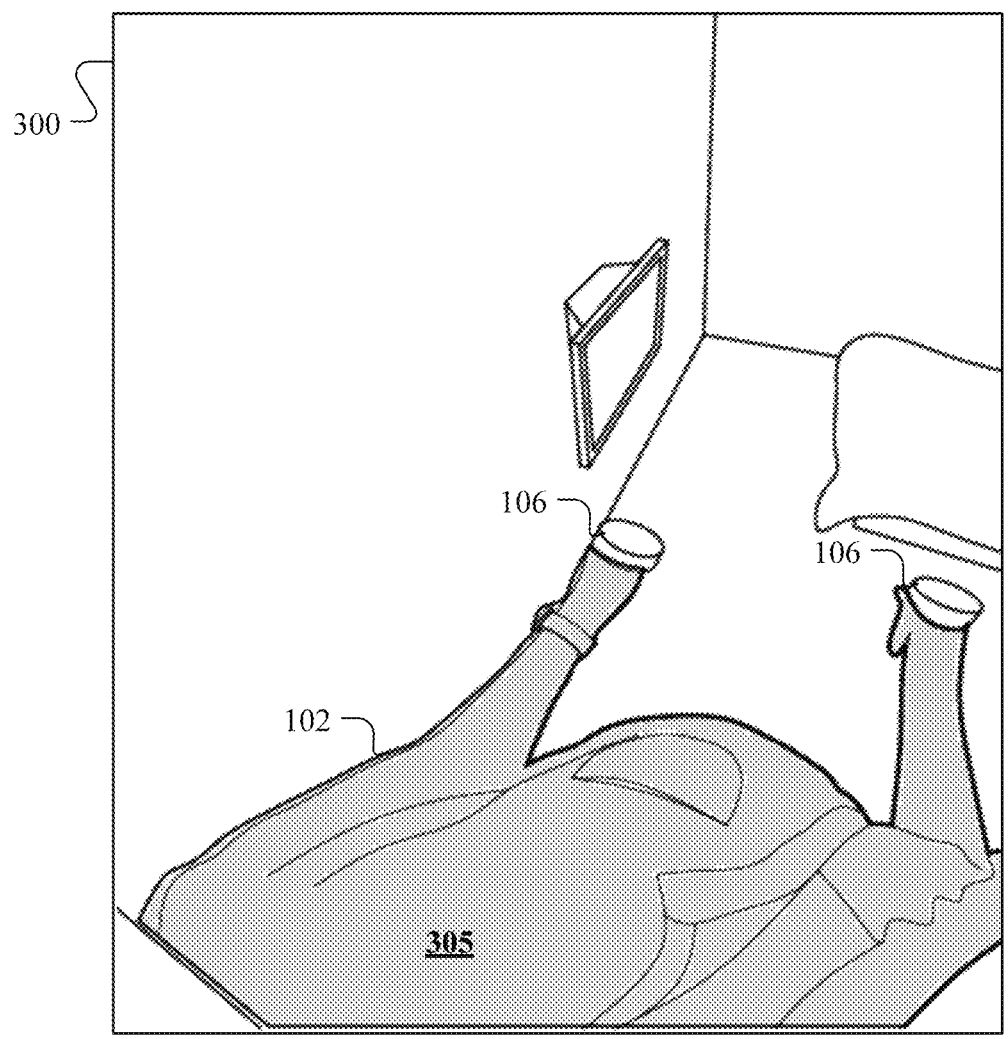
FIG. 3B illustrates one or more regions in the image that correspond to at least a portion of the body of the user.

In particular embodiments the computing system 108 may determine one or more regions in the image 300 that correspond to at least a portion of the body of the user 102. FIG. 3B illustrates one or more regions in the image that correspond to at least a portion of the body of the user. The one or more regions 310 (depicted in grayscale) in the image 300 may be specified by a segmentation mask in the two-dimensional image space. In particular embodiments the segmentation mask may be generated using known segmentation techniques (e.g., Mask R-CNN). In particular embodiments this is done by a machine learning model, for example and not by way of limitation a neural network. The machine learning model may be trained to process a given input image and output a segmentation mask that identifies one or more regions in the image that correspond to a person's body. In particular embodiments, the segmentation mask may be represented as a two-dimensional matrix, with each matrix element corresponding to a pixel in the input image. Each element's value corresponds to whether the associated pixel belongs to the detected person. Although particular data representations for detected persons and segmentation information are described, this disclosure contemplates any suitable data representations of such information.

In particular embodiments, the image data and segmentation mask may be utilized to assess the accuracy of one or more intermediate joint poses inferred by the non-linear solver and subsequently update the non-linear solver to more accurately predict the one or more joint poses in subsequent iterations. As an example, the non-linear solver may receive one or more inputs, for example and not by way of limitation the head pose and wrist pose of the user, and infer an intermediate pose of one or more joints according to the methods described herein, for example an elbow joint pose. In particular embodiments, the computing system may project this inferred intermediate joint pose into two-dimensional space onto the same image plane as the segmentation mask. The computing system may subsequently compare the location of the projected intermediate elbow joint pose with the location of the segmentation mask in the image plane to access the accuracy of the inferred intermediate pose. In particular embodiments the computing system may measure the distance from the projected inferred intermediate elbow pose and the segmentation mask using, for example and not by way of limitation, a signed distance function. If the computing system determines the intermediate joint pose is located in an off position from the body of the user (i.e., the projected intermediate joint pose is not located on the segmentation mask in the image plane), or alternatively that the distance between the projected inferred intermediate pose and the segmentation mask exceeds a minimum predetermined threshold, the non-linear solver may refine the inferred solution in a subsequent iteration to more accurately infer the elbow joint pose (e.g., inferring a pose in a subsequent iteration that is located closer to or within the segmentation mask area). In particular embodiments the computing system may repeat one or more of these steps as necessary until the projected inferred intermediate joint pose falls within a minimum predetermined distance from the segmentation mask in the image plane.

Figure 4:
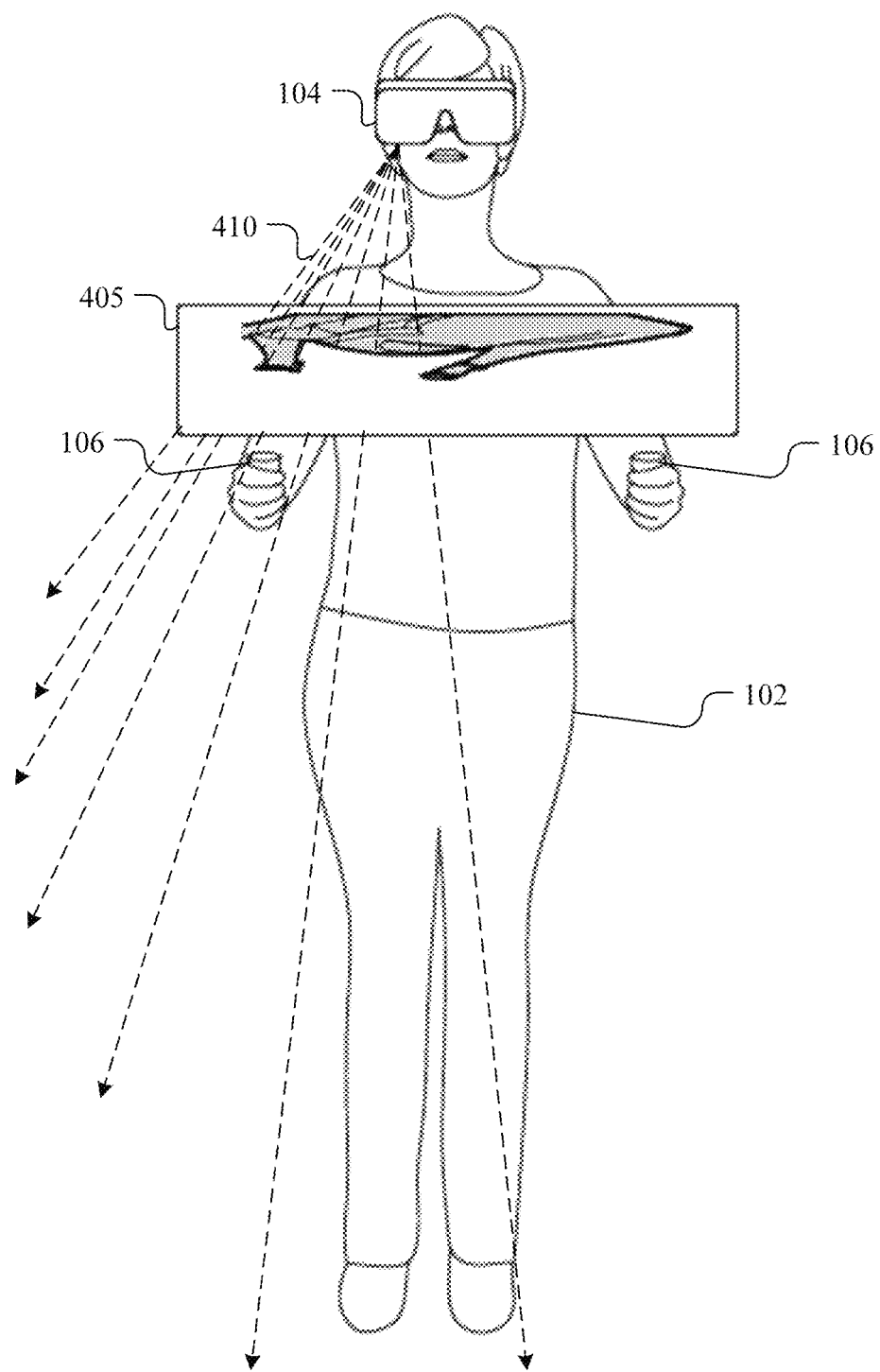
FIG. 4 illustrates a two-dimensional segmentation mask placed into three-dimensional space in from of the user.

The one or more regions in image 300 corresponding to the user's body may be used to generate a three-dimensional volume constraint that could be used by the non-linear solver to determine the user's elbow pose. In particular embodiments the computing system 108 may place the two-dimensional segmentation mask, which specifies the one or more regions in the image 300 that correspond to the user's body, into the three-dimensional space. FIG. 4 illustrates a two-dimensional segmentation mask placed into three-dimensional space in front of the user. In particular embodiments the segmentation mask 405 is placed using known spatial relationships between the camera 110 that captured the image 300 and the corresponding image plane. For example, computing system 108 may determine the pose of the camera 110 in three-dimensional space using the methods described herein. The computing system 108 may also determine a pose of the corresponding two-dimensional segmentation mask 405 in three-dimensional space, using known spatial relationships between the two-dimensional image plane and the camera 110. In particular embodiments, this known spatial relationship between the two-dimensional image plane and the camera 110 may be fixed and determined by one or more known parameters of the camera 110 (e.g., the lens, aperture, focal length, etc.). Using this determined three-dimensional pose of the corresponding two-dimensional image plane for camera 110, computing system 108 may place the segmentation mask 405 in the two-dimensional image plane in three-dimensional space.

In particular embodiments the computing system 108 may utilize at least the segmentation mask 405 to determine a three-dimensional volume constraint based on the one or more regions in the image 300 defined by the segmentation mask 405 and a camera pose of the camera 110 that captured the image 300. In particular embodiments, this three-dimensional volume constraint is based on one or more regions in the segmentation mask that define an area in which a portion of the body of user 102 is likely to be located when the image was captured. In particular embodiments, computing system 108 may determine that at least the elbow joint of user 102 is likely to be located within the three-dimensional volume constraint when the image was captured In particular embodiments the three-dimensional volume constraint is defined by a boundary that stems from the camera 110 of the headset 104 towards the boundaries of the one or more regions of the segmentation mask 405 where the body of user 102 is located when those regions are placed in an image plane of the camera 110. In particular embodiments, the three-dimensional volume constraint may be generated by utilizing ray casting techniques. For example, one or more rays 410 may be cast from the one or more cameras 110 to one or more regions of the segmentation mask where one or more portions of the body of user 102 is likely to be located. This volume created by these casted rays defines a three-dimensional volume where the body of user 102 (including one or more joints) may be located. As an example, if the entire segmentation mask 405 was identified as a region where the body of user 102 was located, the three-dimensional volume constraint would be a pyramid that stems from the camera 110 and extends into space infinitely or for a fixed distance.

In particular embodiments, the image data and segmentation mask be utilized to improve the accuracy of the inference of the pose of elbow joint 230. The non-linear solver may receive one or more of these additional constraints, for example and not by way of limitation the three-dimensional volume constraint, to provide additional data to the non-linear solver to infer a more accurate pose of elbow joint 230. For example, the three-dimensional volume constraint may greatly reduce the possible locations where elbow joint 230 may be located. This is especially useful for certain joint poses that comprise body pose 200, for example and not by way of limitation elbow pose 230. In particular embodiments, the non-linear solver may assign a corresponding variable and predetermined static weight to each additional constraint it receives according to the methods described herein.

In particular embodiments, the non-linear solver may infer, based on at least the head pose 210, the wrist pose 220, and the three-dimensional volume constraint, a body pose 200 associated with user 102 that includes at least an inferred elbow pose 230 associated with user 102. Using these defined constraints, the non-linear solver may infer the pose of one or more joints as described herein. In particular embodiments the non-linear solver may further utilize one or more pose priors to more accurately infer one or more joint poses. In particular embodiments the one or more joints may be located within the regions of the three-dimensional volume constraint associated with one or more regions of the body of user 102. In particular embodiments, this inferred body pose 200 may be utilized for a variety of applications. For example, computing system 108 may utilize body pose 200 to generate an avatar of user 102 in a virtual space. In particular embodiments the computing system 108 may only utilize a portion of the upper body pose 200 for various applications, for example and not by way of limitation, an upper body pose (e.g., from the user's head to the user's hip) or the inferred pose of only one or more joints (e.g. an elbow joint 230).

Figure 5:
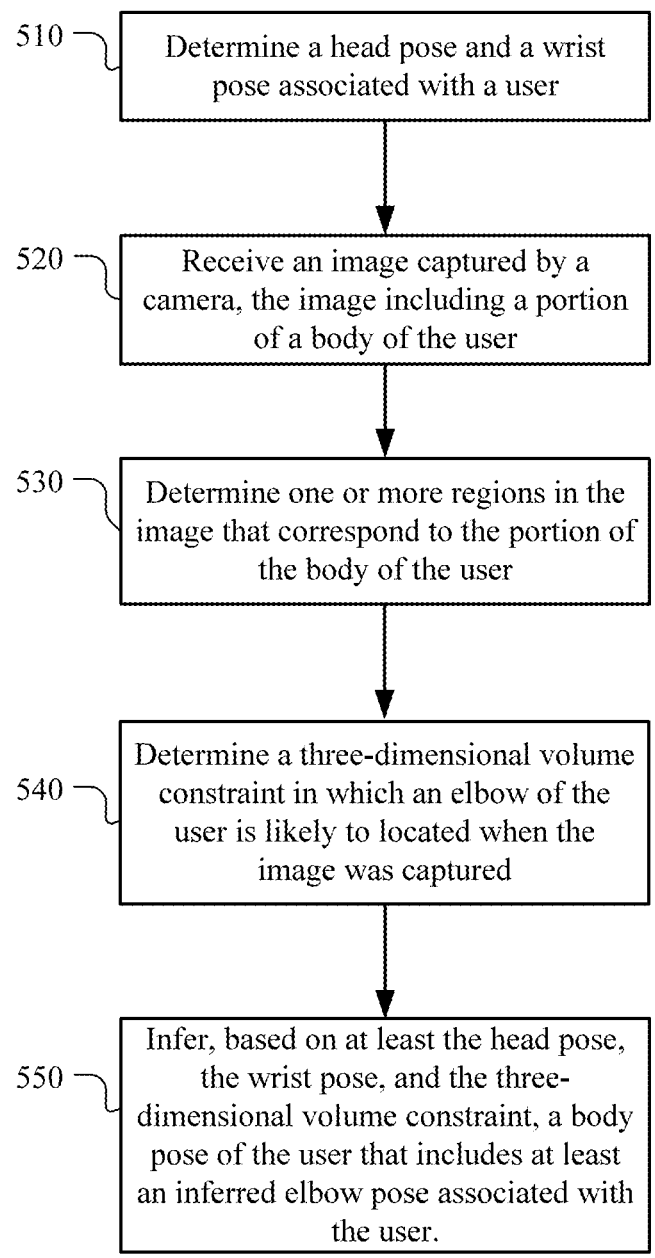
FIG. 5 illustrates an example method for inferring a body pose of user 102 that includes at least an inferred elbow pose associated with the user.

FIG. 5 illustrates an example method 500 for inferring a body pose of user 102 that includes at least an inferred elbow pose associated with the user. The method may begin at step 510, where a computing system determines a head pose and a wrist pose associated with a user. The head pose and wrist pose associated with user may be determined by utilizing any of the sensor data or image data received by the computing system. The head pose and wrist pose may comprise a location and an orientation of the head of user and wrist of the user while using artificial reality system 100. In particular embodiments the head pose and wrist pose may be based on the headset pose or the controller pose and a known spatial relationship.

At step 520, the computing system receives an image captured by a camera, the image including a portion of a body of the user. In particular embodiments the computing system may receive one or more images captured from one or more cameras. In particular embodiments the one or more images are captured from one or more cameras associated with the artificial reality system that are positioned to face downward (e.g., towards the feet of the user while standing). In particular embodiments the headset may comprise the one or more cameras which capture the one or more images.

At step 530, the computing system determines one or more regions in the image that correspond to the portion of the body of the user. In particular embodiments this is done by machine learning model, for example not by way of limitation a neural network, which is a network of interconnected nodes. The machine learning model may output a segmentation mask that identifies one or more regions in the image where at least a portion of the body of user is located. In particular embodiments, the segmentation mask may be represented as a two-dimensional matrix, with each matrix element corresponding to a region of the image and the element's value corresponding to whether the associated region belongs to the detected person.

At step 540, the computing system determines a three-dimensional volume constraint in which an elbow of the user is likely to located when the image was captured. In particular embodiments the three-dimensional volume constraint is defined by a boundary that stems from the camera 110 of the headset 104 towards boundaries of the one or more regions of the segmentation mask where the body of user 102 is located when those regions are placed in an image plane of the camera. In particular embodiments, the three-dimensional volume constraint may be generated by casting one or more rays from the one or more cameras 110 to the image plane to define a three-dimensional volume.

At step 550, the computing system infers, based on at least the head pose, the wrist pose, and the three-dimensional volume constraint, a body pose of the user that includes at least an inferred elbow pose associated with the user. The body pose associated with the user may be inferred by a non-linear solver. May comprise a kinematic hierarchy at a particular time or state.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for inferring a body pose of user 102 that includes at least an inferred elbow pose associated with the user including the particular steps of the method of FIG. 5, this disclosure contemplates any suitable method for inferring a body pose of user 102 that includes at least an inferred elbow pose associated with the user including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
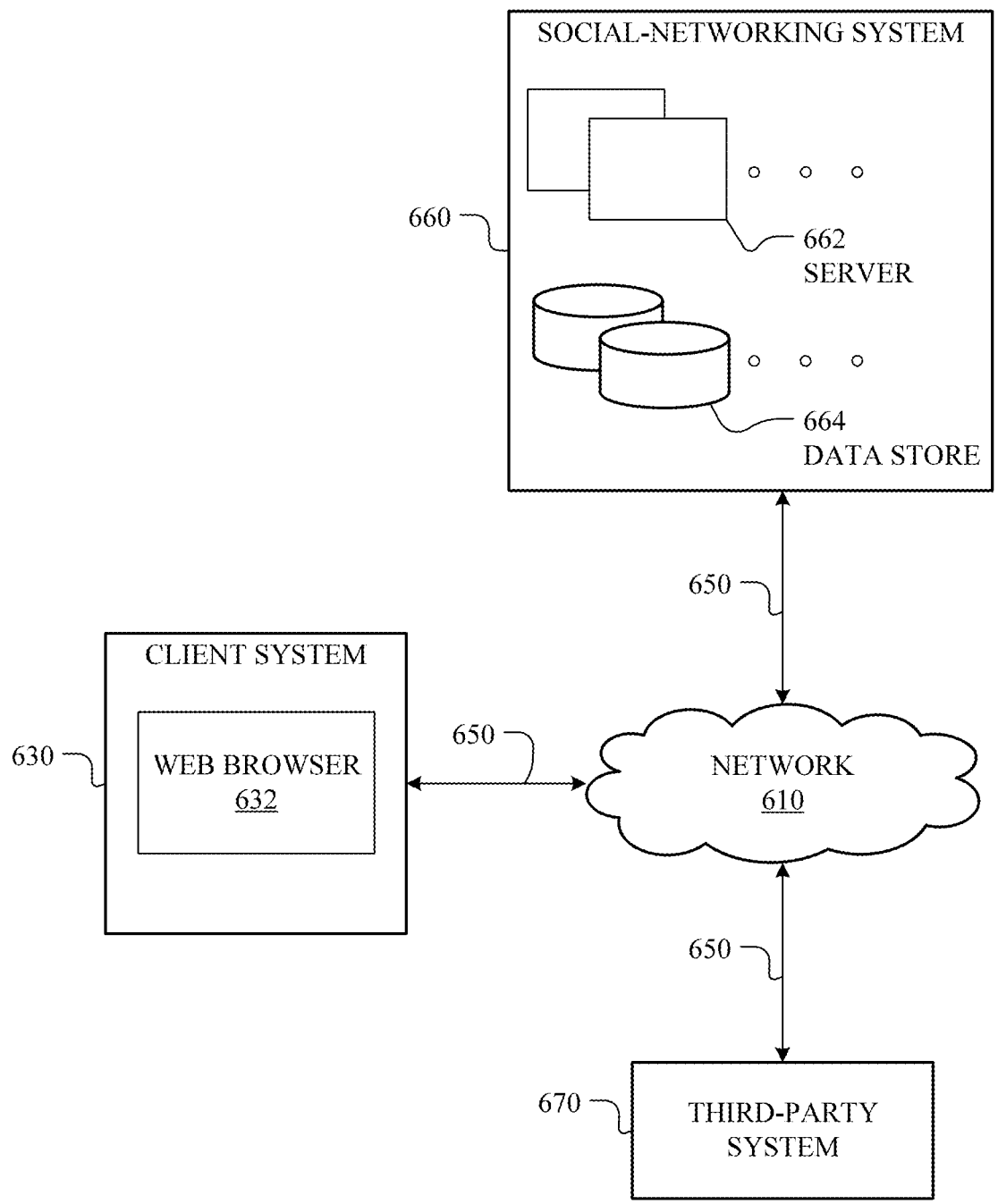
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, and may have one or more add-ons, plug-ins, or other extensions. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data stores 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
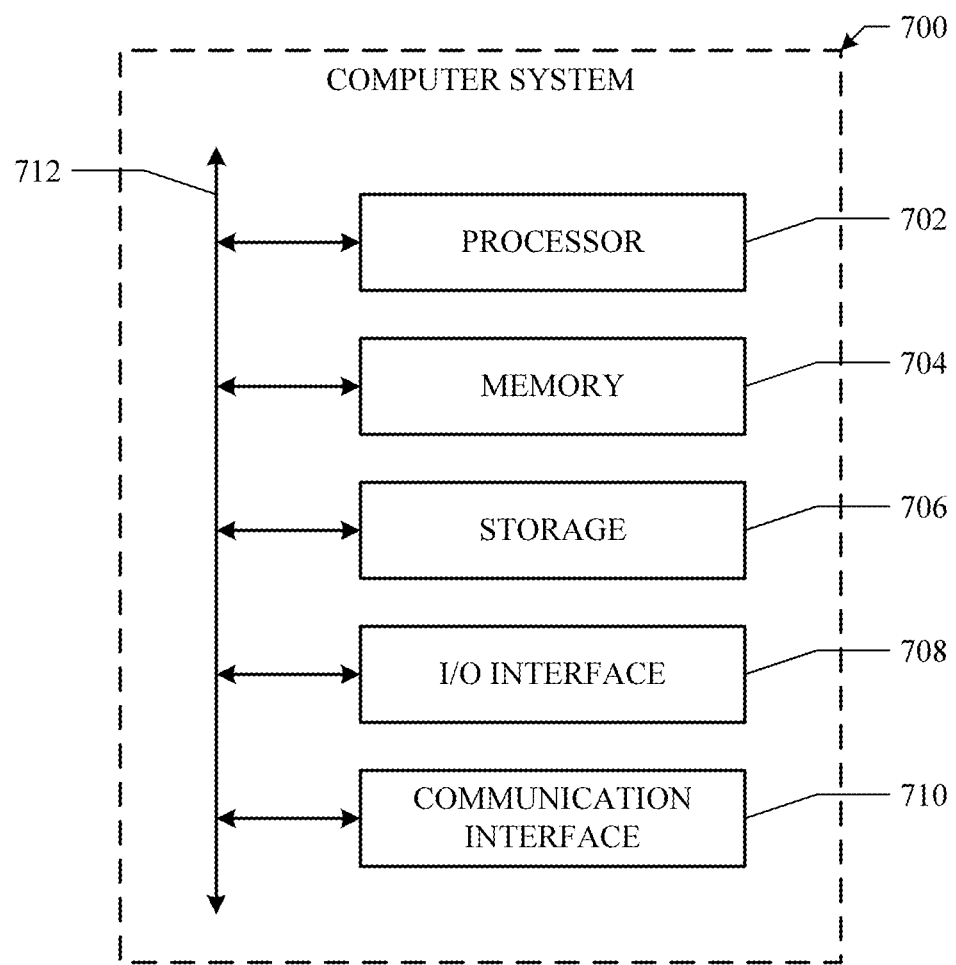
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing device:
receiving an image captured by a camera of a head-mounted device, the image including a portion of a body of the user;
determining, based on (1) one or more regions in the image that include the portion of the body of the user, and (2) a camera pose of the camera, a three-dimensional volume constraint that stems from the camera pose in which an elbow of the user is likely to be located when the image was captured;
inferring, based on at least the three-dimensional volume constraint, an elbow pose of the user, wherein the elbow pose includes a location associated with the elbow of the user in three-dimensional space;
determining that the location associated with the elbow is outside the three-dimensional volume constraint;
in response to the determination that the elbow is located outside the three-dimensional volume constraint, adjusting the inferred elbow pose; and
generating, based on the adjusted elbow pose, a body pose of the user that includes at least the adjusted elbow pose.

2. The method of claim 1, further comprising determining, based on sensor data captured by a head-mounted device worn by a user, a head pose and a wrist pose associated with the user, wherein inferring the elbow pose of the user is further based on the head pose and the wrist pose.

3. The method of claim 2, wherein the sensor data comprises the image captured by the camera of the head-mounted device or a second image captured by a second camera of the head-mounted device, the image or the second image including a portion of a controller held or worn by the user;
the method further comprising:
computing, using the image or the second image, a pose of the controller; and
determining, based on the pose of the controller and an estimated relationship between the controller and a wrist of the user, the wrist pose of the user.

4. The method of claim 1, wherein the body pose of the user that includes at least an adjusted elbow pose associated with the user is generated using a non-linear solver.

5. The method of claim 1, wherein the camera of the head-mounted device is pointed in a downward direction to capture the portion of the body of the user.

6. The method of claim 2, wherein the head pose, the wrist pose, and the image captured by the camera of the head-mounted device are associated with an identical timestamp.

7. The method of claim 1, wherein the one or more regions in the image corresponding to the portion of the body of the user are detected using a machine learning model.

8. The method of claim 1, wherein the one or more regions in the image corresponding to the portion of the body of the user are represented using a segmentation mask.

9. The method of claim 1, wherein the three-dimensional volume constraint is defined by a three-dimensional boundary that stems from the camera pose towards one or more two-dimensional boundaries of the one or more regions in the image when the one or more regions are placed in an image plane of the camera.

10. The method of claim 1, wherein the adjusted elbow pose associated with the user is located within the three-dimensional volume constraint.

11. One or more computer-readable non-transitory storage media comprising software that is operable when executed by a server to:
receive an image captured by a camera of a head-mounted device, the image including a portion of a body of the user;
determine, based on (1) one or more regions in the image that include the portion of the body of the user, and (2) a camera pose of the camera, a three-dimensional volume constraint that stems from the camera pose in which an elbow of the user is likely to be located when the image was captured;
infer, based on at least the three-dimensional volume constraint, an elbow pose of the user, wherein the elbow pose includes a location associated with the elbow of the user in three-dimensional space;
determine that the location associated with the elbow is outside the three-dimensional volume constraint;
in response to the determination that the elbow is located outside the three-dimensional volume constraint, adjust the inferred elbow pose; and
generate, based on the adjusted elbow pose, a body pose of the user that includes at least the adjusted elbow pose.

12. The media of claim 11, wherein the software is further operable when executed by the server to determine, based on sensor data captured by a head-mounted device worn by a user, a head pose and a wrist pose associated with the user, wherein inferring the elbow pose of the user is further based on the head pose and the wrist pose.

13. The media of claim 12, wherein the sensor data comprises the image captured by the camera of the head-mounted device or a second image captured by a second camera of the head-mounted device, the image or the second image including a portion of a controller held or worn by the user;
the software further operable when executed by the server to:
compute, using the image or the second image, a pose of the controller; and
determine, based on the pose of the controller and an estimated relationship between the controller and a wrist of the user, the wrist pose of the user.

14. The media of claim 11, wherein the body pose of the user that includes at least an adjusted elbow pose associated with the user is generated using a non-linear solver.

15. The media of claim 11, wherein the three-dimensional volume constraint is defined by a three-dimensional boundary that stems from the camera pose towards one or more two-dimensional boundaries of the one or more regions in the image when the one or more regions are placed in an image plane of the camera.

16. The media of claim 11, wherein the adjusted elbow pose associated with the user is located within the three-dimensional volume constraint.

17. A system comprising:
one or more processors; and
one or more computer-readable non-transitory storage media coupled to one or more of the processors and comprising instructions operable when executed by one or more of the processors to cause the system to:
receive an image captured by a camera of a head-mounted device, the image including a portion of a body of the user;
determine, based on (1) one or more regions in the image that include the portion of the body of the user, and (2) a camera pose of the camera, a three-dimensional volume constraint that stems from the camera pose in which an elbow of the user is likely to be located when the image was captured;

infer, based on at least the three-dimensional volume constraint, an elbow pose of the user, wherein the elbow pose includes a location associated with the elbow of the user in three-dimensional space;

determine that the location associated with the elbow is outside the three-dimensional volume constraint;

in response to the determination that the elbow is located outside the three-dimensional volume constraint, adjust the inferred elbow pose; and generate, based on the adjusted elbow pose, a body pose of the user that includes at least the adjusted elbow pose.

18. The system of claim 17, wherein the software is further operable when executed by the server to determine, based on sensor data captured by a head-mounted device worn by a user, a head pose and a wrist pose associated with the user, wherein inferring the elbow pose of the user is further based on the head pose and the wrist pose.

19. The system of claim 18, wherein the sensor data comprises the image captured by the camera of the head-mounted device or a second image captured by a second camera of the head-mounted device, the image or the second image including a portion of a controller held or worn by the user;

the instructions further operable to:

compute, using the image or the second image, a pose of the controller; and determine, based on the pose of the controller and an estimated relationship between the controller and a wrist of the user, the wrist pose of the user.

20. The system of claim 17, wherein the adjusted elbow pose associated with the user is located within the three-dimensional volume constraint.

* * * * *